United States Patent
Kelly

[11] Patent Number: 5,885,466
[45] Date of Patent: Mar. 23, 1999

[54] WATER AERATOR AND METHOD

[76] Inventor: Bill B. Kelly, 470 Soll St., Naples, Fla. 34109

[21] Appl. No.: 778,867

[22] Filed: Jan. 2, 1997

[51] Int. Cl.$^6$ ........................................... C02F 1/72
[52] U.S. Cl. ......................... 210/750; 210/758; 210/764; 210/916; 261/76; 261/121.1; 261/DIG. 75
[58] Field of Search .................................... 210/628, 718, 210/721, 747, 750, 758, 764, 916; 261/76, 121.1, DIG. 75

[56] References Cited

U.S. PATENT DOCUMENTS

| | | | |
|---|---|---|---|
| 366,169 | 7/1887 | Hyatt | 261/DIG. 75 |
| 417,664 | 12/1889 | Chichester . | |
| 1,594,947 | 8/1926 | Hartman et al. | 210/760 |
| 1,747,687 | 2/1930 | Wheeler | 261/DIG. 75 |
| 2,521,215 | 9/1950 | Haddeland et al. | 261/28 |
| 3,146,195 | 8/1964 | Berardi | 210/169 |
| 4,478,765 | 10/1984 | Tubbs | 261/76 |
| 4,582,610 | 4/1986 | Baker | 210/747 |
| 4,624,626 | 11/1986 | Sherfinski et al. | 417/87 |
| 4,992,216 | 2/1991 | Saita et al. | 261/122 |
| 5,004,484 | 4/1991 | Stirling | 261/DIG. 75 |
| 5,015,370 | 5/1991 | Fricano | 210/138 |
| 5,035,842 | 7/1991 | Mohn | 261/76 |
| 5,350,543 | 9/1994 | Spradley | 261/36.1 |

*Primary Examiner*—Peter A. Hruskoci
*Attorney, Agent, or Firm*—Merrill N. Johnson

[57] ABSTRACT

A water aerator (1) has a vertically oriented aerator tube (2) with a plurality of water-inlet apertures (3, 16) that preferably are downwardly slanted intermediate an air-inlet end and a water-outlet end of the aerator tube. The aerator tube is positioned linearly inside of a water-input sleeve (4) having a water-input aperture (5) that is proximate a top of the aerator tube. A bottom end of the water-input sleeve is sealed to a portion of the aerator tube that is vertically below the plurality of water-inlet apertures. A one-way air-inlet valve (7, 14) can be provided in an air-inlet conveyance (6) to the aerator tube to prevent possible excess input of water from escaping through the air-inlet conveyance. Pluralities of air-inlet conveyances and aerator tubes can be provided.

2 Claims, 1 Drawing Sheet

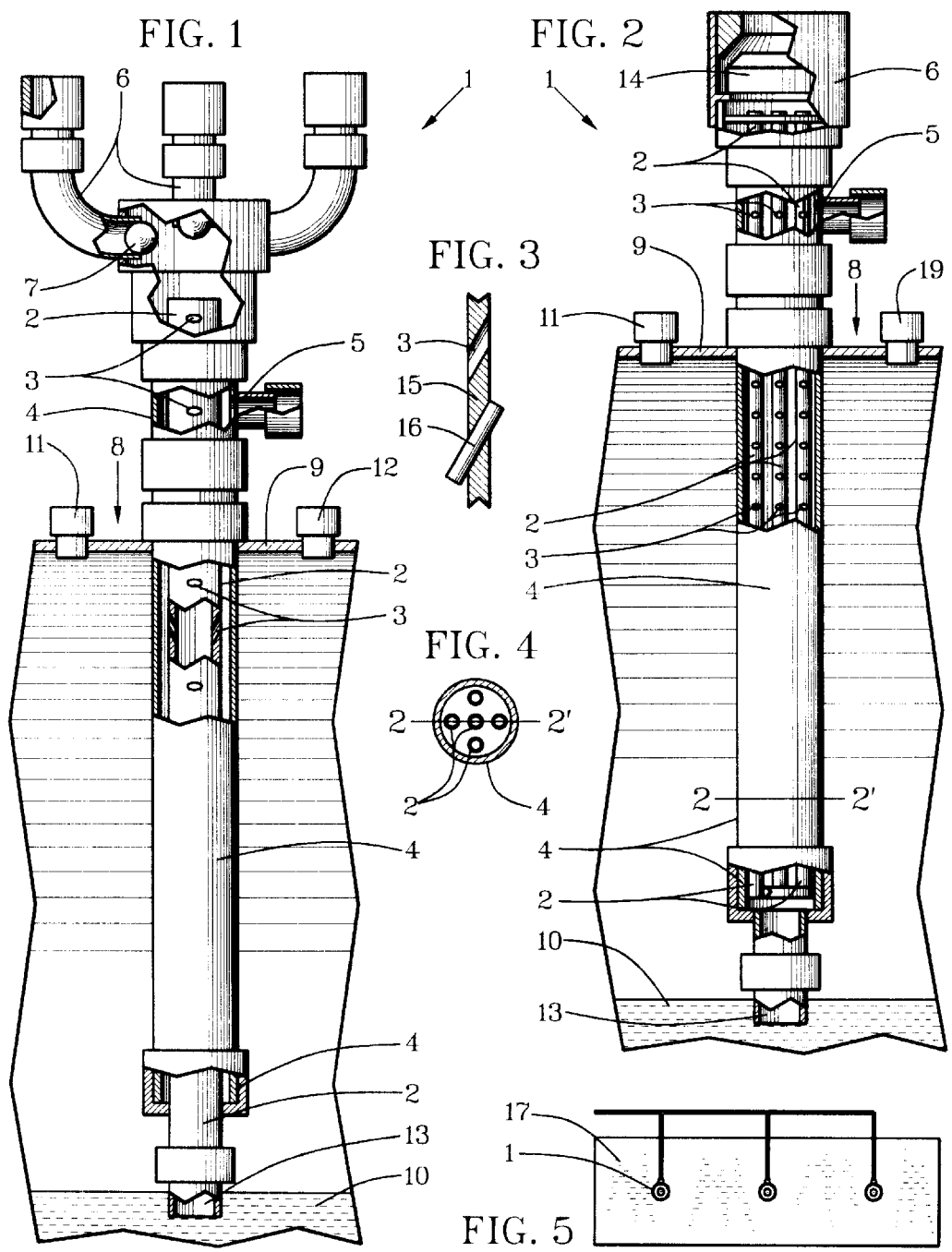

WATER AERATOR AND METHOD

BACKGROUND OF THE INVENTION

1. Field of the Invention

This invention relates to water purifiers and aerators of liquids such as water and hydrous mixtures for removing objectionable substances, gases and living organisms by aeration.

2. Relation To Prior Art

Water purifiers now available for removing objectionable substances do not remove objectionable odors and taste resulting from presence of sulfur, bacteria and other noxious substances sufficiently for desirable potability of water obtained from a large portion of wells, streams, lakes and community supply sources. Previously, aeration of water has been confined to systems constructed mostly for large-scale commercial use. Users of water from independent sources such as wells, lakes and streams have had no independent aerators.

Different but related aerators are described in the following patent documents. U.S. Pat. No. 5,350,543, issued to Spradley, described a vortex type of aerator in a circulator of water in a container. U.S. Pat. No. 3,146,195, issued to Berardi, taught an oyster -tank purifier having an air inlet in a water-straining tube. U.S. Pat. No. 2,521,215, issued to Haddeland et al, taught an apparatus for dispersing an aeriform body in a liquid body. U.S. Pat. No. 417,664, issued to Chrichester, taught a water aerator having a float through which water was circulated for aeration.

SUMMARY OF THE INVENTION

In light of need for improvement of aerators for aeration of water from wells, streams, lakes and often from community water sources, objects of this invention are to provide a water aerator which:

Removes objectionable taste and odor resulting from sulfur and other inorganic content from water;

Removes objectional taste and odor resulting from bacteria and other organic content from water;

Can be adapted to a large range of sizes and types for different use conditions;

Has low cost of operation;

Is long-lasting; and

Can be produced at low cost.

This invention accomplishes these and other objectives with a water aerator having a vertically oriented aerator tube with a plurality of water-inlet apertures that preferably are downwardly slanted intermediate an air-inlet end and a water-outlet end. The aerator tube is positioned linearly inside of a water-input sleeve having a water-input aperture that is proximate a top of the aerator tube. A bottom end of the water-input sleeve is sealed to a portion of the aerator tube that is vertically below the plurality of water-inlet apertures. A one-way air-inlet valve can be provided in an air-inlet conveyance to the aerator tube to prevent back flow of water from escaping through the air-inlet conveyance. Pluralities of air-inlet conveyances and aerator tubes can be provided. The water-outlet end of the aerator tube can be extended designedly into a water container with the water-inlet orifices positioned preferably above a water level of the water container. Water entering the aerator tube from the water-input sleeve through the water-inlet apertures creates a negative pressure for drawing air through the air-inlet conveyance and mixing the air with the water. The air in the water combines variously with different types of objectionable substances in the water and carries the objectionable substances from the water container in gaseous form.

Objectionable substances include soluble sulfur, other minerals and micro organisms such as bacteria that are destroyed by oxygen in aerated water.

A wide variety of sizes of water aerators can be designed for particular use conditions related to small water tanks, large water tanks, pressurized tanks, nonpressurized tanks, small bodies of water, stagnate bodies of water and relatively slow-moving bodies of water.

BRIEF DESCRIPTION OF DRAWINGS

This invention is described by appended claims in relation to description of a preferred embodiment with reference to the following drawings which are described briefly as follows:

FIG. 1 is a partially cutaway elevation view of an embodiment having a single aerator tube;

FIG. 2 is a partially cutaway elevation view of an embodiment having a plurality of aerator tubes;

FIG. 3 is an enlarged sectional view of a wall of an aerator tube having a selection of water-input apertures;

FIG. 4 is a cross-sectional view through line AA' in FIG. 2; and

FIG. 5 is a top view of a body of water in which a plurality of water aerators are positioned.

DESCRIPTION OF PREFERRED EMBODIMENT

Reference is made first to FIG. 1. A water aerator 1 has an aerator tube 2 that is oriented vertically intermediate an air-inlet end proximate a top of the water aerator 1 and a water-outlet end proximate a bottom of the water aerator 1. A plurality of water-inlet apertures 3 are preferably slanted downwardly intermediate the air-inlet end and the water-outlet end of the aerator tube 2. A water-input sleeve 4 has an internal periphery that is positioned a design distance externally from an outside periphery of the aerator tube 2. The water-input sleeve 4 has a water-input aperture 5 proximate a top portion of the water-input sleeve 4 and a bottom end of the water-input sleeve 4 is in sealed contact with a bottom portion of the aerator tube 2. At least one air-inlet conveyance 6 is in fluid communication between a source of air and the air-inlet end of the aerator tube 2. A one-way inlet valve such as a ball valve 7 can be positioned intermediate the aerator tube 2 and the air-inlet conveyance 6 to prevent outflow of water due to air pressure in a water container or water pressure from the water-input aperture 5.

For some uses, the water aerator 1 is positioned in a water container such as a holding tank 8 that is cylindrical and has an air-pressure portion intermediate a top wall 9 and water 10 in the holding tank 8. A gas outlet 11 can be provided to allow escape of gases that combine with air in aerated water and carry away substances such as sulfuric gases and organic gases to thereby remove objectionable tastes and odors from the water 10. A pressure inlet 12 also can be provided for pressurizing the holding tank 8 separately from pressure of water supplied through the water-input aperture 5. A water-input extension 13 of the aerator tube 2 can be provided vertically below the water-input sleeve 4.

Referring to FIG. 2, a plurality of aerator tubes 2 that have smaller diameters and more surface area per conveyance capacity can be utilized. A single air-inlet conveyance 6 with a single one-way inlet valve such as a float valve 14 also can be employed. The plurality of aerator tubes 2 can be in fluid communication with the water-input extension 13, which is a collector conveyance in relation to a plurality of aerator tubes 2, proximate distal ends of the aerator tubes 2 and the water-input sleeve 4.

Referring to FIGS. 1–3, a tube wall 15 of an aerator tube 2 can have inlet tubes 16 with design lengths as an option to or in combination with water-inlet apertures 3 that are slanted downwardly to establish downward flow of water into an aerator tube 2. For use of water-inlet apertures 3 in lieu of inlet tubes 16, tube walls 15 can be sufficiently thick to establish reliable downward flow of water for a down-draft effect. It is preferable but not necessary that the water-inlet apertures 3 and the inlet tubes 16 be slanted downwardly. Small diameters of the water-inlet apertures 3 and/or inlet tubes 16 in combination with sufficient pressure of water provided through the water-input aperture 5 can cause a spray of water into the aerator tube 2 for mixing water with air. Mass of water sprayed into the aerator tubes 2 can create a negative-pressure down-draft for drawing in air through tops of aerator tubes 2.

Referring to FIGS. 2 and 4, a design plurality of aerator tubes 2 can be arranged in accordance with design preferences within the water-input sleeve 4. Depicted in FIG. 4 are five aerator tubes 2 with one positioned centrally.

Referring to FIG. 5, a plurality of water aerators 1 can be positioned in a body of water 17 that can be either pressure-tight for pressurization or open. Open bodies of water 17 can include steams, lakes and tanks.

With reference to FIGS. 1–5, this water aerator can be used independently of a holding tank 8 or body of water 17 by sufficient length and/or plurality of aerator tubes 2 for causing aeration completely within the aerator tubes 2. A separate pumping means can be provided to convey aerated water from the water aerator 1 to a use condition.

If a separate pumping means is used for direct conveyance from the water aerator 1 or from a body of water 17 that is open, then back-pressure valves such as ball valve 7 and float valve 14 can be omitted.

A new and useful water aerator having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A method for removing objectionable tastes and odors from well water and other potable water comprising the following steps:

providing an aerator having down-draft inlet of water into at least one aerator tube that is vertically oriented and has an air-inlet end at a top of the aerator tube and a water-outlet end at a bottom of the aerator tub;

positioning said aerator in a water holding tank; injecting water into the aerator tube through water-input apertures intermediate the air-inlet end and the water-outlet end of the aerator tube, such that downward flow of water in the aerator tube causes a down-draft of water in the aerator tube and the water mixes with air in an aeration process in the aerator tube;

allowing air in the water to encounter and to combine with objectionable substances including sulfur and bacteria in the water so that the air mixes and combines with the objectionable substances and destroys bacteria in the water; directing the water-and-air mixture from the aerator tube into said holding tank; and allowing the air and mixtures of the air and objectionable substances to escape from the water in the holding tank.

2. A method as described in claim 1 and providing the additional step of:

conveying water from the holding tank for use as described.

* * * * *